United States Patent
Staib et al.

(10) Patent No.: US 6,245,874 B1
(45) Date of Patent: Jun. 12, 2001

(54) PROCESS FOR MAKING REPULPABLE WET AND DRY STRENGTH PAPER

(75) Inventors: Ronald Richard Staib, Wilmington, DE (US); Joseph Raymond Fanning; William Walter Maslanka, both of Landenberg, PA (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/516,484

(22) Filed: Mar. 1, 2000

Related U.S. Application Data

(62) Division of application No. 08/994,555, filed on Dec. 19, 1997, now Pat. No. 6,103,861.

(51) Int. Cl.$^7$ .......................... C08G 69/48; D21H 21/20; D21H 17/45
(52) U.S. Cl. ................. 528/3; 528/480; 162/158; 162/164.1; 162/164.3; 162/164.6; 162/167; 162/168.1; 162/168.2; 162/168.3; 162/168.4; 162/189; 162/191; 162/202; 162/206; 427/391; 427/392
(58) Field of Search ................. 528/480, 342; 162/158, 164.3, 164.1, 164.6, 168.1, 168.2, 168.3, 167, 189, 168.4, 191, 202, 206; 427/391, 392

(56) References Cited

U.S. PATENT DOCUMENTS

| | | | |
|---|---|---|---|
| 2,872,313 | 2/1959 | House et al. ............. 92/1.4 |
| 3,372,076 | 3/1968 | Wilkinson ............. 156/190 |
| 3,427,217 | 2/1969 | Miller ............. 162/6 |
| 3,556,932 | 1/1971 | Coscia ............. 162/166 |
| 3,700,623 | 10/1972 | Keim ............. 260/80.3 |
| 3,728,216 | 4/1973 | Bankert ............. 162/167 |
| 3,772,076 | 11/1973 | Keim ............. 117/155 |
| 3,914,155 | 10/1975 | Horowitz ............. 162/167 |
| 4,154,646 | 5/1979 | Rave ............. 162/157 |
| 4,298,715 | * 11/1981 | Van Eenam ............. 525/340 |
| 4,388,439 | 6/1983 | Maslanka ............. 524/845 |
| 4,406,737 | * 9/1983 | Latimer et al. ............. 162/111 |
| 4,416,729 | 11/1983 | Killat et al. ............. 162/164.3 |
| 4,487,884 | 12/1984 | Maslanka ............. 524/845 |
| 4,501,862 | 2/1985 | Keim ............. 525/430 |
| 4,515,657 | 5/1985 | Maslanka ............. 162/164.3 |
| 4,537,657 | 8/1985 | Keim ............. 162/164.3 |
| 4,956,400 | * 9/1990 | Kozakiewicz et al. ............. 523/223 |
| 5,037,863 | * 8/1991 | Kozakiewicz et al. ............. 523/223 |
| 5,041,503 | * 8/1991 | Dauplaise et al. ............. 525/383 |
| 5,330,619 | 7/1994 | Johnson et al. ............. 162/5 |
| 5,427,652 | 6/1995 | Darlington et al. ............. 162/164.3 |
| 5,466,337 | 11/1995 | Darlington et al. ............. 162/164.3 |
| 5,510,004 | * 4/1996 | Allen ............. 162/168.2 |
| 5,567,798 | * 10/1996 | Dulany et al. ............. 162/164.6 |
| 5,585,456 | 12/1996 | Dulany et al. ............. 528/332 |
| 5,633,300 | * 5/1997 | Dasgupta ............. 524/55 |
| 5,720,888 | * 2/1998 | Kuo et al. ............. 210/734 |
| 5,723,022 | * 3/1998 | Dauplaise et al. ............. 162/168.3 |
| 5,865,951 | * 2/1999 | Kawakami et al. ............. 162/158 |
| 5,993,604 | * 11/1999 | Finlayson et al. ............. 162/168.1 |

FOREIGN PATENT DOCUMENTS

| | | |
|---|---|---|
| 0585955 A1 | 9/1994 | (EP) . |
| 94/20682 | 9/1994 | (WO) . |
| 94/29523 | 12/1994 | (WO) . |
| 95/21298 | 8/1995 | (WO) . |
| 98/02611 | 1/1997 | (WO) . |
| 97/30221 | 8/1997 | (WO) . |

OTHER PUBLICATIONS

Schmalz, A. Chandler, TAPPI, vol. 44, pp. 275–280 (Apr. 1961).

Smook, Gary A., "Handbook for Pulp & Paper Technologists, Second Edition", Angus Wilde Publications, 1992, pp. 194–195; 211–212, (No Month).

* cited by examiner

*Primary Examiner*—P. Hampton-Hightower
(74) *Attorney, Agent, or Firm*—Martin F. Sloan

(57) ABSTRACT

A process for making paper with increased wet and dry strength by incorporating into the pulp suspension an ionic thermosettable resin which is the reaction product of dialdehyde and epihalohydrin, or epihalohydrin equivalent, with a copolymer containing monomer units derived by polymerization of monomers comprising acrylamide or alkyl-substituted acrylamide and diallylamine or an acid salt thereof. The paper has wet and dry strength greater than that of paper not containing the resin and has a higher repulpability index than wet strength paper that is essentially the same but contains conventional polyazetidinium ion containing wet strength resin instead of the ionic thermosettable resin.

21 Claims, No Drawings

PROCESS FOR MAKING REPULPABLE WET AND DRY STRENGTH PAPER

CROSS REFERENCE TO RELATED APPLICATIONS

This is a division of U.S. patent application Ser. No. 08/994,555, filed Dec. 19, 1997, U.S. Pat. No. 6,103,861.

FIELD OF THE INVENTION

The invention relates to resin compositions useful for imparting wet and dry strength to paper and to wet and dry strength paper made therefrom. The invention further relates to methods for preparing the resins. Paper made using the resins are repulped faster that paper made with conventional wet strength resins.

BACKGROUND OF THE INVENTION

There are a variety of paper applications which benefit from increased paper dry and wet strength. Dry strength is particularly desirable for applications such as high performance liner board, tissue and towel, printing and writing grades, and for improving the runnability of newsprint. Major application areas for wet strength include liquid packaging board and towels.

Dry strength, generally measured by tensile strength, burst strength or compression strength, can be increased by utilizing increased amounts of fiber, by utilizing a higher proportion of long fibers, or by use of various natural and synthetic polymeric additives such as starch, vegetable gums, acrylamide polymers and polyvinyl alcohol. Generally it is found that the most economical method is use of polymeric additives.

The wet strength of ordinary paper, defined as the resistance of the paper to rupture or disintegration when it is wetted with water, is only about 5% of its dry strength. A variety of paper treatments has been proposed in the art to increase the wet strength of paper. The most widely practiced method commercially is the incorporation of wet strength resins. These are either of the "permanent" or "temporary" type, defined by how long the paper retains its wet strength after wetting with water. While high wet strength is desirable in many applications, papers having such characteristics are often repulpable only under severe conditions. While there are resins that provide temporary wet strength and thus better repulpability, their wet strength is generally not as high as that obtained with the so called permanent wet strength resins. Many wet strength resins also increase the dry strength of the paper in which they are incorporated.

Polyaminoamide-epichlorohydrin resins, which contain azetidinium functionality, are widely used commercially for wet strength. Resins containing azetidinium groups are substantive and thus self-retaining to cellulose fibers. Such resins undergo crosslinking upon a rise in pH, loss of water and/or increase in temperature to form an insoluble polyamide network. This type of resin produces quite substantial increases in dry and wet tensile strength. Resins containing azetidinium groups are available commercially from Hercules Incorporated, Wilmington, Del. as Kymene®557H, Kymene®557LX and Kymene®736 wet strength resins.

The high levels of "permananent" wet strength that are produced by resins containing azetidinium functionality is generally accompanied by difficulty in recycling or reclaiming the paper by repulping back to individual fibers. Repulping such paper requires treating it under heat and chemical conditions adequate to cause amide hydrolysis while subjecting it to sufficient physical forces to break apart the fiber network. The most common approach is the use of alkali, but oxidants, e.g., hypochlorite or persulfate, are often employed also.

U.S. Pat. No. 5,466,337 describes repulpable wet strength paper containing a permanent cationic wet strength resin and a temporary cationic wet strength resin, the temporary cationic wet strength resin being a glyoxylated vinylamide wet strength resin, and the permanent wet strength resin being selected from the group consisting of polyamine epichlorohydrin, polyamide epichlorohydrin, and polyamine-amide epichlorohydrin resins.

U.S. Pat. No. 5,585,456 discloses wet strength resins prepared by reaction of a dialdehyde and epichlorohydrin with polyaminoamide prepared from a polyamine and polycarboxylic acid or ester. Wet strengthened paper are stated to be more easily repulped than paper made with conventional wet strength agents.

U.S. Pat. Nos. 3,700,623 and 3,772,076 disclose a copolymer of acrylamide and diallylamine which is reacted with epichlorohydrin. The product imparts enhanced wet and dry strength to paper.

U.S. Pat. No. 3,372,086 describes a cationic water-soluble resin produced by reacting a polyalkylenepolyamine with a saturated aliphatic dialdehyde and then with epihalohydrin. The resin effects increased wet strength in paper.

There is continuing pressure on the paper industry by environmentally conscious paper users to increase the repulpability of paper products. Moreover, stricter legislative standards are being imposed on the paper industry. As indicated above, recycling is difficult for some papers containing strength resins. Consequently, there is a need for new polyazetidinium resins that can impart substantial wet and dry strength to paper while improving the repulpability of the paper as compared to conventional wet strength resins.

SUMMARY OF THE INVENTION

An ionic thermosettable resin comprises the dialdehyde and epihalohydrin, or epihalohydrin equivalent, reaction product of a copolymer containing monomer units derived by polymerization of monomers comprising acrylamide or alkyl-substituted acrylamide and diallylamine or an acid salt thereof. The ionic thermosettable resin comprises repeating units of formulas 1 and 2

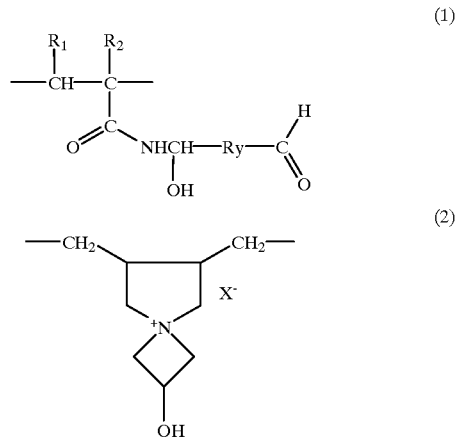

where y is 0 or 1, $R_1$ and $R_2$, which may be the same or different, are hydrogen or $C_1$–$C_3$ alkyl, X− is an anion derived by ionization of an acid, and when y is 1 R is $C_1$ to about $C_8$ alkylene or phenylene.

The ionic thermosettable resin is produced by:

a) providing a polymeric resin comprising repeating units of formulas 3 and 4

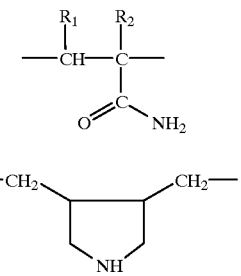

(3)

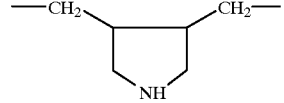

(4)

where $R_1$ and $R_2$, which may be the same or different, are hydrogen or $C_1$–$C_3$ alkyl; and b) reacting the polymeric resin with dialdehyde and epihalohydrin or epihalohydrin equivalent.

The ionic thermosettable resin of the invention imparts wet and dry strength to paper greater than that of paper that is the same except that it does not contain the ionic thermosettable resin. Moreover, the paper repulps faster than does paper that is essentially the same but contains conventional wet strength resin instead of the ionic thermosettable resin of the invention.

DETAILED DESCRIPTION OF THE INVENTION

Preparation of the ionic thermosettable resins of the invention begins by providing a copolymer of diallylamine and acrylamide or alkyl-substituted acrylamide of the structure $R_1CH=CH(R_2)CONH_2$, where $R_1$ and $R_2$, which may be the same or different, are hydrogen or $C_1$–$C_3$ alkyl. Preferably $R_1$ and $R_2$ are hydrogen or methyl, and more preferably they are hydrogen. Examples of suitable acrylamides are acrylamide, methacrylamide and crotonamide. Acrylamide is preferred. Copolymers of acrylamide and diallylamine are described in U.S. Pat. Nos. 3,700,623 and 3,772,076, which are incorporated herein by reference in their entireties. The diallylamine may also be used in the form of a mineral acid salt, preferably a salt of hydrochloric acid.

The copolymers may be prepared by free radical polymerization of the acrylamide or substituted acrylamide and diallylamine, or preferably a mineral acid salt of diallylamine, in water using free radical initiation. The best results are obtained with a redox catalyst system, which gives good control of molecular weight and undetectable levels of residual monomer. However, conventional free radical catalysts, e.g., 2,2'azoisobutyronitrile and 2,2'-azobis (2-amidinopropane)hydrochloride, may be used as well. Diallylamine may be utilized as a mineral acid salt. Preferably the mineral acid is hydrochloric acid. A batch process where the catalyst system and a solution of the acrylamide are added simultaneously to diallylamine hydrochloride is a preferred way for preparing a uniform copolymer with good control of molecular weight and with undetectable levels of residual monomer.

The resulting copolymer comprises repeating units of formulas 3 and 4

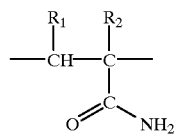

(3)

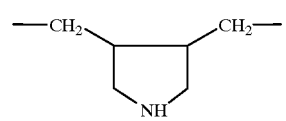

(4)

where $R_1$ and $R_2$ are hydrogen or $C_1$–$C_3$ alkyl. The repeating units of formula 4 may also be present entirely or partially as an acid salt of a mineral acid, preferably hydrochloric acid.

The copolymer may comprise additional repeating units derived by copolymerization of a wide variety of additional vinyl monomers. Examples of such polymerizable vinyl monomers are acrylic acid or salts thereof, methacrylic acid or salts thereof, alkyl esters of acrylic acid, alkyl esters of methacrylic acid, N-alkyl acrylamides, N,N-dialkylacrylamides, N-alkyl methacrylamide, N,N-dialkylmethacrylamides, acrylonitrile, 2-vinylpyridine, N-vinylpyrrolidinone, diallyldimethyl ammonium chloride, 2-(dimethylamino) ethyl acrylate, (p-vinylphenyl)-trimethyl ammonium chloride, [2-(acryloyloxy)ethyl] trimethylammonium halide, [2-(methacryloyloxy)ethyl] trimethylammonium halide and [3-(methacryloylamino) propyl]trimethylammonium halide. Preferred are acrylic acid and methacrylic acid. Most preferred is acrylic acid.

When the copolymer does not comprise additional comonomers, or when the comonomers are cationic, the ionic thermosettable resin will be cationic. When anionic comonomers or potentially anionic monomers, e.g. acrylic or methacrylic acids, are utilized, the resin will be amphoteric or have the potential for being amphoteric at pH's where the carboxyl groups are ionized.

For use in the invention the composition of the copolymer is preferably such that the repeating units of formulas 3 and 4 are from about 10 to 100% of the total number of repeating units, more preferably about 50 to 100%, even more preferably about 70 to 100%, and most preferably about 100% of the total number of repeating units.

The ratio of the number of repeating units of formula 3 to the number of repeating units of formula 4 in the copolymer is preferably from about 1:99 to about 99:1, more preferably from about 10:90 to about 90:10, and most preferably from about 20:80 to about 80:20.

The degree of polymerization or molecular weight of the copolymer is not critical for the invention. Relative values of molecular weight are most readily estimated by measurement of the reduced specific viscosity (RSV) of a 2% solids polymer (as the acid salt) solution in 1 M ammonium chloride solution at 25° C. Preferably the RSV of the copolymer is from about 0.05 to about 0.3 dl/g, more preferably from about 0.08 to about 0.2 dl/g and most preferably from about 0.1 to about 0.15 dl/g.

Conversion of the copolymer to the ionic thermosettable resin of the invention requires reaction of the copolymer with epihalohydrin, and with dialdehyde. While the use of epichlorohydrin, the preferred epihalohydrin, will hereinafter be described, it is to be understood that other halohydrins and halogen-free epihalohydrin equivalents such glycidyl alkyl or aryl sulfonate are contemplated also, and could be used in practicing the invention. Examples of glycidyl alkyl or aryl sulfonates are glycidyl methanesulfonate and glycidyl p-toluenesulfonate.

It is preferred that the reaction with epichlorohydrin be carried out before the reaction with dialdehyde. The dialdehyde can react with both the amide group of repeating unit 3 and the amine group of repeating unit 4, but the epichlorohydrin can react only with the amine group of repeating unit 4. Consequently, if the dialdehyde reaction is carried out first, it is possible depending on the amounts used, that substantially all of the amine groups would be consumed, leaving an insufficient number for reaction with epichlorohydrin. This possibility can be avoided by carrying out the epichlorohydrin reaction first. For the reaction of epihalohydrin or epihalohydrin equivalent with the copolymer, epihalohydrins are preferred, and the preferred epihalohydrin is epichlorohydrin. The preferred epihalohydrin equivalents are glycidyl methanesulfonate and glycidyl p-toluenesulfonate.

The reaction with epichlorohydrin is carried out in aqueous medium, i.e., water or water containing a non-interfering water miscible solvent. Preferred solvents are water-miscible alcohols, e.g., ethanol and isopropanol. To conduct the reaction the copolymer is dissolved in the aqueous medium at a solids content of about 5 to about 50% by weight, and then the pH is adjusted to greater than about 7, preferably about 9 by addition of alkali. Then the epichlorohydrin is added. A suitable reaction temperature ranges from about 10° C. to about 95° C., preferably from about 25° C. to about 75° C. The time required will depend on the reaction temperature. Generally the reaction is continued until the reaction mixture reaches a particular viscosity endpoint. Preferably the reaction is allowed to proceed until the Brookfield viscosity of a 12.5% aqueous solution is from about 5 to about 200 cps, and more preferably from about 20 to about 50 cps. The amount of epichlorohydrin is preferably from about 0.5 to about 1.8 moles, and more preferably from about 1 to about 1.5 moles for each mole of formula 4 contained in the copolymer.

To terminate the reaction with epichlorohydrin after the desired viscosity is achieved, the mixture may be cooled to ambient temperature and preferably adjusted to a final solids content of 30% or less, more preferably 15% or less, and most preferably 13% or less. Stability is also improved by adjustment of the pH to less than about 7, preferably from about 3 to about 6, with acid. Either mineral acid such as hydrochloric, sulfuric, nitric and phosphoric acids, or organic acids such as formic and acetic acids and the like, as well of mixtures thereof, may be used.

Preferred dialdehydes for reaction with the copolymer are glyoxal and $C_1$ to about $C_8$ saturated or unsaturated alkylene or phenylene dialdehydes. Examples of such dialdehydes include malonic dialdehyde, succinic dialdehyde, glutaraldehyde, adipic dialdehyde, 2-hydroxyadipic dialdehyde, pimelic dialdehyde, suberic dialdehyde, azelaic dialdehyde, sebacic dialdehyde, maleic aldehyde, fumaric aldehyde, phthalaldehyde, isophthalaldehyde, terephthalaldehyde, and 1,4-diformylcyclohexane. The most preferred dialdehyde is glyoxal.

The amount of dialdehyde used for reaction is preferably from about 0.01 to about 1 moles for each mole of formula 3 contained in the copolymer. More preferably the amount is from about 0.1 to about 0.7 moles, and most preferably from about 0.2 to about 0.5 moles for each mole of formula 3 contained in the copolymer.

The reaction between the dialdehyde and copolymer is preferably carried out at a pH of about 5 to about 10 and a temperature of from about 20° C. to about 90° C. for a time sufficient to reach the viscosity target for the product. More preferably the pH is from about 7 to 9 and the temperature from about 25 to 50° C. During the reaction of dialdehyde with the copolymer some crosslinking of the product will occur through reaction of the aldehyde group in repeating unit 1 with another amide-containing polymer chain. The crosslinking is accompanied by an increase in viscosity. The preferable target viscosity for the product is a Brookfield viscosity of about 20 to about 300 cps as a 7% solids aqueous solution. More preferably the target viscosity is from about 50 to about 200 cps, and most preferably from about 80 to about 150 cps.

The product of the reaction of the copolymer with epichlorohydrin and dialdehyde is an ionic thermosettable resin comprising repeating units of formulas 1 and 2 where y is 0 or 1, $R_1$ and $R_2$ are hydrogen or $C_1$–$C_3$ alkyl, X– is an anion derived by ionization of an acid, and when y is 1 R is $C_1$ to about $C_8$ alkylene or phenylene. The anion X–, which may be a mixture of anions, is derived from the mineral acid used for salt formation with diallylamine, from the halide or other leaving group present in the epihalohydrin or epihalohydrin equivalent, and from the acids that are used to adjust the pH of the reaction mixtures.

The composition of the resin is preferably such that the sum of the number of repeating units of formulas 1 and 2 is from about 10 to 100% of the total number of repeating units, more preferably about 50 to 100%, even more preferably about 70 to 100%, and most preferably about 100% of the total number of repeating units. The ratio of the number of repeating units of formula 1 to the number of repeating units of formula 2 in the copolymer is preferably from about 1:99 to about 99:1, more preferably from about 10:90 to about 90:10, and most preferably from about 20:80 to about 80:20.

The resin prepared in accordance with this invention is a cationic or amphoteric, thermosettable, water-soluble resin which is self-retaining on paper and ideally suited for use as a wet and dry strength resin which imparts enhanced dry strength and effectively permanent wet strength to the paper. The term "permanent wet strength" as used herein means that no significant wet strength is lost during 24 hours of water soaking at ambient temperature. Moreover, paper containing the resin repulps faster than paper that is essentially the same but contains conventional wet strength resin instead of the ionic thermosettable resin of the invention.

In preparing paper with the resins of this invention, aqueous pulp suspensions of all kinds may be utilized, including but not limited to bleached and unbleached cellulose pulps made by mechanical and/or chemical pulping procedures such as by the Kraft sulfite, sulfate or semi-chemical pulping processes, as well as mixtures of such pulps.

Other ingredients or additives commonly used in papermaking can also be used in conjunction with the resins of this invention, e.g., starch, alum, sizes, and fillers such as clay, calcium carbonate, titanium dioxide, talc, and the like.

The resin may be incorporated into the pulp slurry at any desired point at the wet end of the paper machine. Conventionally the pulp slurry is converted to a paper web by deposition onto a screen or wire followed by heating and drying. Instead of adding the resin to the pulp slurry, it may also be applied to the dried or partially dried web. However, incorporation into the pulp slurry is preferred. The resin is generally added to provide from 0.05 to about 2 wt. % on a dry basis based on the dry weight of the pulp. A more preferable addition level is from about 0.1 to about 1 wt. %, and a most preferable level of from about 0.2 to about 0.5 wt.

% on a dry basis based on the dry weight of the pulp. The resin can be added to the paper under acid, neutral or alkaline conditions.

The ionic thermosettable resin of the invention is cured to a water-insoluble form subsequent to its incorporation in paper in order to effect an increase in wet and dry strength. Such curing is suitably accomplished in the drying stage of conventional paper making process, the resins being readily heat cured during the paper drying operation. Drying temperatures normally employed in commercial paper making operations of about 85° C. to about 160° C. are capable of effecting cure of the resins of the invention.

Paper and paperboard treated with the resins of this invention exhibit wet and dry strength greater than that of paper that is the same except that it does not contain the resin. The dry strength is substantially equivalent to that obtained using conventional wet strength resins, in particular the epichlorohydrn reaction product of polyaminoamide made from adipic acid and diethylene triamine. Such resins are available as Kymene®557H, Kymene®557LX wet strength resins, from Hercules Incorporated, Wilmington, Del. The wet strength is somewhat less than that of the epichlorohydrin reaction product of polyaminoamide made from adipic acid and diethylene triamine, but it is at least as high as that obtained with glyoxylated polyacrylamide resins, such as Parez®631NC, available from Cytec Industries, Inc., West Paterson, N.J.

The paper of the invention is found to be more easily repulped than that containing the conventional polyazetidinium ion containing wet strength resins, e.g. Kymene®557H, Kymene®557LX wet strength resins, at approximately the same wet strength level. Resins of the invention where the ratio of the number of repeating units of formula 1 to the number of repeating units of formula 2 is from about 20:80 to about 80:20 are particularly preferred for effecting significant wet strength but with improved repulpability.

The process of repulping of this invention refers to any mechanical action that disperses dry, pulp fibers into an aqueous pulp fiber suspension. Conditions for repulping, as well as equipment commercially used, are discussed in "Handbook for Pulp & Paper Technologists, Second Edition" by G. A. Smook, Angus Wilde Publications, 1992, pp.194–195 and 211–212, which reference is incorporated herein by reference in its entirety.

Conditions for repulping depend to a substantial degree on the type of paper that is used. For paper containing no wet strength resin repulping can take place readily in water at any temperature. The water may contain additional ingredients such as wetting agents and pH buffers. However, to repulp wet strength papers containing conventional wet strength resins, temperatures of 50° C., or higher, are required in conjunction with chemical additives such as those discussed in U.S. Pat. Nos. 2,872,313, 5,330,619 and 3,427,217, in European Patent Application Publication No. 585,955-A, in PCT International Publication Nos. WO94/20682, and in TAPPI, 44, no.4, pp 275–280, April, 1961.

In the laboratory, repulpability is conveniently determined using a disintegrator described in TAPPI method T205 OM-88, (1988), which is incorporated herein by reference in its entirety. Using this test, it is found that paper prepared by the process of this invention can be repulped in substantially less time than is required to repulp the same paper containing conventional wet strength resin at about the same level of wet strength.

The pH at which the repulping is carried out is not critical. Preferably the pH is from about 5 to about 12, more preferably from about 7 to about 10.

Because repulpability is dependent on wet strength (i.e., for a given resin, the higher the wet strength, the lower the repulpability), different resins should be compared at equal wet strength. Obtaining paper samples having the same wet strength levels but containing different wet strength resins is difficult, however. Thus, a method to normalize repulpability differences for wet strength differences has been developed. Since repulpability is inversely proportional to wet strength, such a "repulpability index" can be calculated as:

Repulpability Index=(wet tensile strength)×(% fiber yield)/100.

Thus a higher repulpability index value indicates better repulpability. For small differences in wet strength, this repulpability index provides a good method for determining relative differences in repulpability at equal wet strength.

This invention is illustrated by the following examples, which are exemplary only and not intended to be limiting. All percentages, parts, etc., are by weight, unless otherwise indicated.

Procedures

Dry Tensile: Dry tensile strength of paper samples was determined by TAPPI method T-494 om-88.

Wet Tensile: Wet tensile strength of paper samples was determined by TAPPI method T-494 om-88 using paper samples that had been water soaked for 2 hours.

Ring Crush Compression Strength: Ring crush compression strength was determined by TAPPI method T-818 om-87.

Mullen Burst Strength: Mullen burst strength was determined by TAPPI method T-807 om-94.

Repulpability and Fiber Yield: Paper was conditioned overnight at 23° C. and 50% relative humidity. The paper for testing was cut into 1 inch squares. A total weight of 30 g of paper was used for the test. Demineralized water (1970 ml) was added to the stainless steel container of a TAPPI Standard Pulp Disintegrator, Model SE 003. The water was heated to 50° C. and then the pre-weighed cut paper was added, yielding a consistency of 1.5%. The paper was allowed to soak for 15 minutes at 50° C., and then the disintegrator was turned on. The paper slurry was allowed to repulp for 5 to 15 minutes at 3,000 rpm by setting the appropriate number of revolutions on the disintegrator. The temperature was maintained at 50° C. throughout.

A Huygen Instruments Somerville Fractionating Screen, Model BK-34, with a screen slot width of 0.15 mm, was utilized for determination of fiber yield. It was connected to a standard tap water supply at the control panel. The drain valve at the bottom of the overflow reservoir was closed and tap water was allowed to fill the screen box. The water pressure flushing the slotted screen was adjusted to 124 kPa. The water level above the screen (4 inches) was controlled by inserting the weir in the overflow reservoir. A circular 150 mesh sieve screen was placed at the discharge of the reservoir to collect fiber accepts that pass through the stainless steel slotted screen.

After the disintegrator stopped, a 300 ml aliquot of the repulped slurry was removed and added to the water-filled screen box. The Somerville Fractionating unit was run for 10 minutes after addition of the slurry, at the end of which time no more fibers could be observed in the outflow from the slotted screen. Then the unit was switched off at the control panel, and the water was allowed to drain through the 150 mesh sieve. The weir was removed from the overflow reservoir, and the weir and the reservoir were rinsed with water, which was drained through the sieve.

The screen box was opened and the rejects (unrepulped paper, bundles and shives) on the surface of the slotted screen were collected. The rejects were poured into a Buchner funnel containing a tared filter paper under suction. The filter paper containing the rejects was dried on a hot plate to constant weight (about 5 minutes), and the dry weight of the rejected fraction was recorded.

The accept fraction (fully repulped fibers) from the 150 mesh screen was collected with a Buchner funnel containing a tared filter paper. The filter paper was dried on a hot plate to constant weight (about 5 minutes), and the dry weight of the accepts was recorded.

Repulpability, as percent fiber recovery or percent fiber yield, was calculated as: 100×(dry weight of accepts)/(dry weight of accepts+rejects).

EXAMPLE 1

This example illustrates the preparation of an 80:20 mole ratio acrylamide:diallylamine copolymer using 2,2'-azobis (2-amidinopropane)hydrochloride free radical initiator as a catalyst.

A reactor was charged with 11.4 g (0.12 moles) of diallylamine (98%) and 156.2 g of deionized water. Hydrochloric acid, 11.6 g of 37.2% aqueous hydrocloric acid (0.12 moles) was added with stirring while the temperature was kept below about 40° C. The solution was sparged with argon for 1 hour, and then 2.4 g (0.04 moles) of isopropanol was added. The resulting solution was heated to 90° C., and while the reaction mixture was blanketed with argon, 3.2 g (0.012 moles) of 2,2'-azobis(amidinopropane)hydrochloride (V-50 from Wako Chemicals USA, Inc., Richmond, Va.) dissolved in enough nitrogen sparged water to give a total of 32 ml, and 66.8 g of 50% aqueous acrylamide solution (0.47 moles) were added over a period of 4 hours. During the course of the reaction concentrated hydrochloric acid was added to maintain the pH at 3–4. After the addition was complete, the reaction mixture was maintained at 90° C. for 1 hour while the pH was maintained at 3–4. The amount of concentrated hydrochloric acid used for pH control during the reaction was 1.7 g.

The final product after cooling to ambient temperature was 275.3 g of copolymer solution with 19.1% total solids and a reduced specific viscosity (determined on a 2% solution in 1 M $NH_4Cl$ at 25° C.) of 0.140 dL/g.

EXAMPLE 2

This example illustrates the preparation of an 80:20 mole ratio acrylamide:diallylamine copolymer using a reduction/ oxidation (redox) dual catalyst system.

A reactor was charged with 87.3 g (0.899 moles) of diallylamine (98%) and 829.0 g of deionized water. Hydrochloric acid, 86.4 g of 37.9% aqueous hydrochloric acid (0.898 moles) was added with stirring while the temperature was kept below about 40° C. Adipic acid, 18.9 g (0.129 moles) was added to the solution as a buffer, and the pH was adjusted to 4.5 with 21.9 g (0.164 moles) of 30% sodium hydroxide solution. The solution was sparged for 1 hour with argon and then heated to 60° C. While the reaction mixture was blanketed with argon, 21.4 g (0.09 moles) of sodium persulfate dissolved in enough nitrogen sparged water to give a total of 100 ml and 17.1 g (0.90 moles) of sodium metabisulfite dissolved in enough nitrogen sparged water to give 100 ml were added over a period of 4 hours. Simultaneous with the catalyst addition, 512.0 g of 50% acrylamide solution (3.60 moles) was added over a period of 3.5 hours. During the course of the reaction 30% sodium hydroxide was added to maintain the pH at 4–5. After the addition was complete the reaction mixture was maintained at 60° C. for 1 hour while the pH was maintained at 4–5. The amount of 30% sodium hydroxide used for pH control during the reaction was 23.3 g.

The final product after cooling to ambient temperature was 1788.8 g of copolymer solution with 25.5% total solids and a reduced specific viscosity of 0.108 dL/g.

EXAMPLE 3

This example illustrates the preparation of a 40:60 mole ratio acrylamide:diallylamine copolymer using a redox catalyst system.

The process of Example 2 was followed using 1210.8 g of water, 262.3 g (2.7 moles) of diallylamine (98%), 259.7 g (2.7 moles) of hydrochloric acid (37.9%), 18.9 g (0.126 moles) of adipic acid, 256.0 g (1.8 moles) of acrylamide (50% aqueous solution), 10.7 g (0.045 moles) of sodium persulfate, and 8.6 g (0.045 moles) of sodium metabisulfite. About 12 g of 30% sodium hydroxide was used for pH control.

The final product after cooling to ambient temperature was 2140.3 g of copolymer solution with 25.2% total solids and a reduced specific viscosity of 0.177 dL/g.

EXAMPLE 4

This example illustrates the preparation of a 25:75 mole ratio acrylamide:diallylamine copolymer using 2,2'-azobis (2-amidinopropane)hydrochloride initiator.

The process of Example 1 was followed using 1099.5 g of water, 291.5 g (3.0 moles) of diallylamine (98%), 288.6 g (3.0 moles) of hydrochloric acid (37.9%), 142.2 g (1.0 moles) of acrylamide (50% aqueous solution), 23.6 g (0.393 moles) of isopropanol, 30.7 g (0.111 moles) of 2,2'-azobis (2-amidinopropane)hydrochloride. About 2.5 g of concentrated hydrochloric acid was used for pH control.

The final product after cooling to ambient temperature was 1998.6 g of copolymer solution with 25.5% total solids and a reduced specific viscosity of 0.163 dL/g.

EXAMPLE 5

This example illustrates the preparation of a cationic thermosettable resin of the invention from a copolymer prepared by the process in Example 2.

A reaction vessel was charged with 745.1 g of copolymer solution prepared by the process of Example 2 and 172.6 g of deionized water. The pH of the solution was adjusted to 9 with 30% sodium hydroxide. Epichlorohydrin (52.6 g, 0.568 moles) was added all at once, and the resulting solution was heated to 60° C. and held at that temperature until the Gardner-Holdt viscosity remained at A– for 1 hour and 28 minutes, after which 647.0 g of dilution water was added. During the course of the reaction sodium hydroxide was added to keep the pH above 7. When the reaction was completed the pH was adjusted to about 3 with concentrated hydrochloric acid. The solution was cooled to 25° C. and diluted to 12.5% solids with deionized water.

A reaction vessel was charged with 200.0 g of the above solution. Water (73.1 g) and 7.7 g of 40% glyoxal (0.053 moles) were added and then the pH was adjusted to about 9 with 30% sodium hydroxide. The reaction was allowed to proceed until solution viscosity (as measured by the time for 5 ml of solution to flow out of a 2 mm bore glass capillary tube) was about 80 seconds. Deionized water (49.6 g) was added, and the reaction was allowed to continue until the solution viscosity was again about 80 seconds. Deionized water (44 g) was added and the pH adjusted to about 3 with concentrated hydrochloric acid. The final solution at 7% total solids had a Brookfield viscosity of about 62 cps (#1 spindle, 60 rpm).

EXAMPLE 6

This example illustrates the preparation of a cationic thermosetting resin of the invention from a copolymer prepared by the process of Example 1.

The process of Example 5 was followed except the viscosity during the epichlorohydrin reaction was taken to Gardner-Holdt "C". During the glyoxal reaction the initial pH adjustment was to 7.5 and the sample was reacted to Gardner-Holdt "B".

EXAMPLE 7

This example illustrates the preparation of a cationic thermosetting resin of the invention from a copolymer prepared by the process in Example 4.

The process of Example 5 was followed except the viscosity during the epichlorohydrin reaction was taken to Gardner-Holdt "E". During the glyoxal reaction the initial pH adjustment was to 8.1, and the reaction was immediately quenched with HCl to pH 3.

EXAMPLE 8

This example illustrates the preparation of a cationic thermosetting resin of the invention from a copolymer prepared by the process in Example 3.

The process of Example 5 was followed except the viscosity during the epichlorohydrin reaction was taken to Gardner-Holdt "D–E". During the glyoxal reaction the viscosity was taken to about 76 seconds in the first stage and about 95 seconds in the second stage.

EXAMPLE 9

This example illustrates the preparation of an amphoteric thermosetting resin of the invention from a 20:60:20 mole ratio acrylamide:diallylamine:acrylic acid copolymer.

A reactor was charged with 29.1 g (0.3 moles) of diallylamine (98%) and 113.7 g of deionized water. Hydrochloric acid, 28.9 g of 37.9% aqueous hydrochloric acid (0.3 moles) was added with stirring while the temperature was kept below about 40° C. The solution was sparged 1 hour with argon and then heated to 60° C. While the reaction mixture was blanketed with argon, 3.57 g (0.015 moles) of sodium persulfate dissolved in enough nitrogen-sparged water to give a total of 25 ml and 2.85 g (0.015 moles) of sodium metabisulfite dissolved in enough nitrogen-sparged water to give 25 ml were added over a period of 4 hours. Simultaneously with the catalyst addition, a solution of 14.2 g of 50% acrylamide solution (0.1 moles) and 7.2 g (0.1 moles) of acrylic acid were added over a period of 3.5 hours. After the addition was complete the reaction mixture was maintained at 60° C. for 1 hour.

The final product after cooling to ambient temperature was 241.3 g of copolymer solution with 24.7% total solids and a reduced specific viscosity of 0.106 dL/g.

A reaction vessel was charged with 101.2 g of the copolymer solution and 83.4 g of deionized water. The pH of the solution was adjusted to 7 with 30% sodium hydroxide. Epichlorohydrin (14.9 g, 0.16 moles) was added all at once, and then the resulting solution was heated to 60° C., and the viscosity was taken to Gardner-Holdt "F", after which 66.5 g of dilution water was added. During the course of the reaction sodium hydroxide was added to keep the pH at about 7. When the reaction was completed the pH was adjusted to about 3 with concentrated hydrochloric acid; the solution was cooled to 25° C. and diluted to 12.5% solids with deionized water.

A reaction vessel was charged with 159.6 g of the above solution. Water (43 g) and 0.87 g of 40% glyoxal (0.006 moles) were added and then the pH was adjusted to about 9 with 30% sodium hydroxide. The reaction was allowed to proceed until solution viscosity (as measured by the time for 5 ml of solution to flow out of a 2 mm bore glass capillary tube) was about 90 seconds. Deionized water (50.9 g) was added, and the pH was adjusted to about 3 with concentrated hydrochloric acid. The final solution at 7% total solids had a Brookfield viscosity of 54 cps (#1 spindle, 60 rpm).

EXAMPLE 10

In this example ionic thermosettable resin prepared in Example 6 was evaluated in unbleached kraft hand sheets at an addition level of 0.2 wt. %. For comparison, paper containing no resin, paper containing Parez®631NC, a glyoxylated cationic polyacrylamide wet strength resin available from Cytec Industries, Inc., West Paterson, N.J., and paper containing Kymene®557H, a polyazetidinium wet strength resin available from Hercules Incorporated, Wilmington, Del., were also prepared and evaluated.

Paper handsheets were prepared from James River Marathon unbleached kraft dry lap pulp refined to 630 ml Canadian standard freeness at pH 7.5. The sheets were generated to have a basis weight of 80 lb/3000 sq. ft. The tensile strengths and repulping tests were carried out on paper after natural aging for 2 weeks. The results are presented in Table 1.

TABLE 1

| Example | Resin | Resin Level (%) | Papermaking pH | Dry Tensile (lbs/in) | Wet Tensile (lbs/in) | Repulpability (% Fiber Yield) | Repulpability Index[1] |
|---|---|---|---|---|---|---|---|
| 10A | Parez ® 631 NC | 0.2 | 5.0[2] | 56.6 | 5.5 | 99 | 5.4 |
| 10B | Example 6 | 0.2 | 5.0[2] | 57.9 | 5.3 | 100 | 5.3 |
| 10C | Parez ® 631NC | 0.2 | 7.5 | 49.2 | 2.3 | 100 | 2.3 |
| 10D | Example 6 | 0.2 | 7.5 | 51.6 | 4.7 | 100 | 4.7 |
| 10E | Parez ® 631 NC | 0.5 | 5.0[2] | 50.4 | 3.1 | 100 | 3.1 |
| 10F | Example 6 | 0.5 | 5.0[2] | 51.3 | 6.2 | 99 | 6.1 |

TABLE 1-continued

| Example | Resin | Resin Level (%) | Papermaking pH | Dry Tensile (lbs/in) | Wet Tensile (lbs/in) | Repulpability (% Fiber Yield) | Repulpability Index[1] |
|---|---|---|---|---|---|---|---|
| 10G | Kymene ® 557 H | 0.5 | 7.5 | 49.2 | 13.1 | 15 | 2.0 |
| 10H | Example 6 | 0.5 | 7.5 | 51.8 | 5.7 | 100 | 5.7 |
| 10I | None | — | 7.5 | 44.0 | 1.5 | 100 | — |

[1]Repulpability Index = (wet tensile strength ) × (% fiber yield)/100.
[2]pH adjusted by addition of alum.

The data confirm that the resin of the invention, i.e., the one prepared in Example 6, gives wet and dry strength greater than that observed in the absence of resin. The data further indicate that at the 0.2% dosage level and acid pH the resins perform comparably to Parez®631NC, a gloxylated cationic polyacrylamide, in wet strength, dry strength and repulpability. At alkaline pH, the resin gave twice the wet strength of Parez®631 NC and yet was still completely repulpable.

At the 0.5% dosage level and acid pH the resin of Example 6 gave twice the wet strength of Parez®631N, yet with complete repulpability. At alkaline pH the resin yielded lower wet strength than Kymene®557H, a conventional polyazetidinium resin, but with a substantially higher repulpability index. It is noteworthy that the paper containing Kymene®557H was not completely repulpable under the conditions used.

EXAMPLE 11

This example illustrates the use of resin prepared by the process described in Example 5 to improve the wet and dry strength of paper prepared from recycled corrugated container furnish, compared to the same paper made using cationic starch (Stalok®430 from A. E. Staley Manufacturing Co., Decatur, Ill.) a widely used dry strength additive.

The paper was made at pH 5.5–6 and contained no alum. The basis weight was 80 lb/3000 ft$^2$.

The result are presented in Table 2.

TABLE 2

| Example | % Starch | % Resin | Dry Tensile (lbs/in) | Wet Tensile (lbs/in) |
|---|---|---|---|---|
| 11A | 0 | 0 | 35.4 | 1.4 |
| 11B | 0 | 0.1 | 35.6 | 1.9 |
| 11C | 0 | 0.2 | 36.9 | 2.6 |
| 11D | 0 | 0.3 | 37.8 | 3.0 |
| 11E | 0.5 | 0 | 34.8 | 1.3 |
| 11F | 0.5 | 0.1 | 38.6 | 2.1 |
| 11G | 0.5 | 0.2 | 41.5 | 2.7 |
| 11H | 1.5 | 0 | 35.9 | 1.7 |
| 11I | 1.5 | 0.1 | 38.9 | 2.2 |
| 11J | 1.5 | 0.2 | 40.5 | 2.8 |
| 11K | 1.5 | 0.3 | 40.6 | 3.2 |
| 11L | 1.5 | 0.5 | 42.5 | 4.0 |

The example demonstrates that the resin of this invention gives both wet and dry strength superior to that obtained with cationic starch alone.

EXAMPLE 12

This example illustrates the use of resin prepared by the process described in Example 5 to improve the wet and dry strength of paper prepared from a recycled corrugated container furnish, compared to the same paper made using cationic starch (Stalok®430 from A. E. Staley Manufacturing Co., Decatur, Ill.) a widely used dry strength additive. In this example the results obtained by making the paper at two different pH's, 5.5 and 7.0 are compared.

The papers were prepared as in Example 11 to a basis weight of 100 lbs/3000 ft$^2$.

The results are presented in Table 3.

TABLE 3

| Example | % Starch | % Resin | Ring Crush, lbs. | Dry Tensile, lbs/in | Wet Tensile, lbs/in |
|---|---|---|---|---|---|
| pH 5.5 | | | | | |
| 12A | 0 | 0 | 72.5 | 43.1 | 1.59 |
| 12B | 0.5 | 0 | 68.8 | 43.7 | 1.96 |
| 12C | 0.5 | 0.1 | 74.6 | 46.9 | 2.97 |
| 12D | 0.5 | 0.2 | 77.0 | 48.5 | 3.82 |
| 12E | 0.5 | 0.3 | 78.0 | 48.1 | 4.60 |
| 12F | 0.5 | 0.4 | 77.3 | 50.4 | 5.19 |
| 12G | 1.0 | 0 | 71.2 | 47.4 | 2.30 |
| 12H | 1.0 | 0.1 | 72.7 | 48.7 | 3.30 |
| 12I | 1.0 | 0.2 | 77.1 | 49.8 | 3.87 |
| 12J | 1.0 | 0.3 | 76.6 | 50.7 | 4.50 |
| 12K | 1.0 | 0.4 | 79.5 | 50.2 | 5.15 |
| pH 7.0 | | | | | |
| 12L | 0 | 0 | 67.5 | 42.6 | 1.30 |
| 12M | 1.0 | 0 | 70.6 | 43.7 | 1.68 |
| 12N | 1.0 | 0.2 | 75.3 | 47.9 | 2.87 |
| 12O | 1.0 | 0.3 | 75.1 | 49.1 | 2.85 |
| 12P | 1.0 | 0.4 | 75.7 | 49.2 | 3.88 |

Comparison of entries 12I–K with 12N–P indicate that somewhat higher values of ring crush and wet and dry tensile are obtained when the resin is used at paper making of pH 5.5 as compared to 7.

EXAMPLE 13

This example illustrates the use of the resin prepared by the process of Example 8 to improve the dry strength of paper prepared from a groundwood newsprint furnish, and the impact of papermaking pH on effectiveness of the resin.

In addition to the additives listed, the paper contained 2% clay filler and was prepared at 25 g/m$^2$ basis weight from a blend of 95% groundwood pulp and 5% softwood kraft pulp.

The results are presented in Table 4.

TABLE 4

| Example | % Resin | Mullen Burst, lbs/in$^2$ | Dry Tensile, lbs/in |
|---|---|---|---|
| pH 7.0 | | | |
| 13A | 0 | 7.4 | 8.2 |
| 13B | 0.2 | 8.1 | 8.8 |

TABLE 4-continued

| Example | % Resin | Mullen Burst, lbs/in² | Dry Tensile, lbs/in |
|---------|---------|----------------------|---------------------|
| 13C | 0.4 | 8.3 | 8.4 |
| 13D | 0.8 | 7.7 | 9.8 |
| pH 4.5, 1% alum | | | |
| 13E | 0 | 6.0 | 8.0 |
| 13F | 0.2 | 6.3 | 7.6 |
| 13G | 0.4 | 6.6 | 7.6 |
| 13H | 0.8 | 6.8 | 7.4 |

The results indicate that the resin prepared from a 40:60 mole ratio acrylamide:diallylamine copolymer is more effective at a papermaking pH of 7.0 than at 4.5.

EXAMPLE 14

This example illustrates the use of the resin prepared by the process of Example 5 to improve the dry strength of paper prepared from a groundwood newsprint furnish at acid papermaking pH.

The paper was made from the same ingredients used in Example 13. The paper making pH was 4.5.

The data are presented in Table 5.

TABLE 5

| Example | % Resin | Mullen Burst, lbs/in² | Dry Tensile, lbs/in |
|---------|---------|----------------------|---------------------|
| 14A | 0 | 8.1 | 8.0 |
| 14B | 0.2 | 8.2 | 8.2 |
| 14C | 0.4 | 8.8 | 9.8 |
| 14D | 0.8 | 11.0 | 10.3 |

The data indicate that the resin prepared from an 80:20 mole ratio acrylamide:diallylamine copolymer is more effective at improving the dry strength of groundwood newsprint at acid pH than the resin prepared by the process of Example 8.

EXAMPLE 15

This example illustrates the use of the resin prepared by the process of Example 6 to improve the wet and dry strength of paper prepared from a liquid packaging board furnish. For comparison, the same paper was prepared using Kymene®557LX polyazetidinium wet-strength resin, available from Hercules Incorporated, Wilmington, Del.

The paper was prepared at pH 5.0 utilizing 1.5% alum, no starch and no size from a 60:40 blend of bleached hardwood kraft pulp/bleached softwood kraft pulp. The basis weight was 175 lb/3000 ft².

The data are presented in Table 6.

TABLE 6

| Example | Resin | % Resin | Dry Tensile, lbs/in | Wet Tensile, lbs/in | Fiber Yield (%) | Repulpability Index |
|---------|-------|---------|---------------------|---------------------|-----------------|---------------------|
| 15A | Kymene 557LX | 0.25 | 71.6 | 11.6 | 73 | 8.5 |
| 15B | Kymene 557LX | 0.50 | 71.9 | 14.0 | 50 | 7.0 |
| 15C | Kymene 557LX | 0.75 | 70.3 | 14.8 | 45 | 6.6 |
| 15D | Example 6 | 0.25 | 70.7 | 5.7 | 100 | 5.7 |

TABLE 6-continued

| Example | Resin | % Resin | Dry Tensile, lbs/in | Wet Tensile, lbs/in | Fiber Yield (%) | Repulpability Index |
|---------|-------|---------|---------------------|---------------------|-----------------|---------------------|
| 15E | Example 6 | 0.50 | 74.4 | 7.5 | 98 | 7.4 |
| 15F | Example 6 | 0.75 | 79.4 | 8.7 | 97 | 8.5 |

The data indicate that although paper prepared with the resin of Example 6 provides lower wet strength at the same level than does Kymene®557LX, it is more repulpable.

EXAMPLE 16

This example illustrates the use of the resin prepared by the process of Example 7 to improve the wet and dry strength of paper prepared from a liquid packaging board furnish.

The paper was made at pH 8 to a basis weight 175 lb/3000 ft² from a 60:40 blend of bleached hardwood kraft pulp/bleached softwood kraft pulp. In addition the strength resin, it contained 0.5% cationic starch, 0.15% AKD size. No alum was used.

The results are in Table 7.

TABLE 7

| Example | Resin | % Resin | Dry Tensile, lbs/in | Wet Tensile, lbs/in | Fiber Yield (%) | Repulpability Index |
|---------|-------|---------|---------------------|---------------------|-----------------|---------------------|
| 16A | Kymene 557LX | 0.4 | 82.5 | 15.5 | 34 | 5.3 |
| 16B | Example 7 | 0.25 | 82.8 | 10.9 | 78 | 8.4 |
| 16C | Example 7 | 0.50 | 84.4 | 13.0 | 57 | 7.4 |
| 16D | Example 7 | 0.75 | 84.6 | 13.8 | 54 | 7.6 |

The data demonstrate that the paper prepared with the resin of Example 7 is more repulpable with a higher repulpability index than the same paper containing Kymene®557LX polyazetidinium wet-strength resin.

EXAMPLE 17

This example illustrates the use of the resin prepared by the process of Example 9 to improve wet and dry strength of paper.

The paper was made at pH 7–8 from unbleached kraft pulp furnish to a basis weight of 80 lb/3000 ft². The control contained no resin.

The results are in Table 8.

TABLE 8

| Resin | % Resin | Dry Tensile, lbs/in | Wet Tensile, lbs/in | Mullen Burst, psi |
|-------|---------|---------------------|---------------------|-------------------|
| None | — | 39.6 | 0.8 | 49.0 |
| Example 9 | 0.5 | 52.5 | 7.9 | 75.2 |

The results indicate that incorporation of the resin improves both the wet and dry strength of the paper.

It is not intended that the examples presented here should be construed to limit the invention, but rather they are submitted to illustrate some of the specific embodiments of the invention. Various modifications and variations of the present invention can be made without departing from the scope of the appended claims.

What is claimed is:

1. A process for making paper with increased wet and dry strength comprising:
   (a) providing an aqueous pulp suspension;
   (b) adding to the pulp suspension a strength additive comprising an ionic thermosettable resin which is the reaction product of dialdehyde and epihalohydrin, or epihalohydrin equivalent, with a copolymer containing monomer units derived by polymerization of monomers comprising acrylamide or alkyl-substituted acrylamide and diallylamine or an acid salt thereof; and
   (c) converting the aqueous suspension obtained in (b) to a paper web and drying the web to obtain paper.

2. The process of claim 1 wherein the reaction with epihalohydrin or epihalohydrin equivalent is performed prior to the reaction with dialdehyde.

3. The process of claim 1 wherein the ionic thermosettable resin is added at a level of from about 0.05 to about 2 wt. % on a dry basis based on the dry weight of the pulp.

4. The process of claim 1 wherein the ionic thermosettable resin is added at a level of from about 0.1 to about 1 wt. % on a dry basis based on the dry weight of the pulp.

5. The process of claim 1 wherein the ionic thermosettable resin is added at a level of from about 0.2 to about 0.5 wt. % on a dry basis based on the dry weight of the pulp.

6. The process of claim 1 wherein the acrylamide or substituted acrylamide is acrylamide.

7. The process of claim 1 wherein the dialdehyde is glyoxal.

8. Paper prepared by the process of claim 1.

9. The paper of claim 8 that has a higher repulpability index than that of paper containing conventional polyazetidinium ion containing wet strength resin at about the same wet strength level.

10. The paper of claim 9 wherein the ratio of number of monomer units derived from acrylamide or alkyl-substituted acrylamide to the number of monomer units derived from diallylamine or salts thereof is from about 20:80 to about 80:20.

11. The paper of claim 9 wherein the conventional polyazetidinium ion containing wet strength resin is an epihalohydrin reaction product of a polyaminoamide made by reaction of adipic acid and diethylenetriamine.

12. A process for making paper with increased wet and dry strength comprising:
   (a) providing an aqueous pulp suspension;
   (b) adding to the pulp suspension a strength additive comprising an ionic thermosettable resin comprising repeating units of formulas 1 and 2

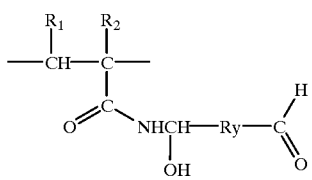

(1)

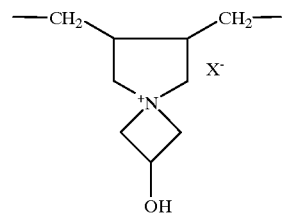

(2)

where y is 0 or 1, $R_1$ and $R_2$ are hydrogen or $C_1$–$C_3$ alkyl, X– is an anion derived by ionization of an acid, and when y is 1, R is $C_1$ to about $C_8$ phenylene or saturated or unsaturated alkylene; and (c) converting the aqueous suspension obtained in (b) to a paper web and drying the web to obtain paper.

13. The process of claim 12 wherein the ionic thermosettable resin is added at a level of from about 0.05 to about 2 wt. % on a dry basis based on the dry weight of the pulp.

14. The process of claim 12 wherein the acrylamide or substituted acrylamide is acrylamide.

15. The process of claim 12 wherein the dialdehyde is glyoxal.

16. Paper prepared by the process of claim 12.

17. The paper of claim 16 that has a higher repulpability index than that of paper containing conventional polyazetidinium ion containing wet strength resin at about the same wet strength level.

18. The paper of claim 17 wherein wherein the ratio of number of repeating units of formula 1 to the number of repeating units of formula 2 is from about 20:80 to about 80:20.

19. The paper of claim 17 wherein the conventional polyazetidinium ion containing wet strength resin is an epihalohydrin reaction product of a polyaminoamide made by reaction of adipic acid and diethylenetriamine.

20. A process for repulping the paper of claim 8 comprising:
   (a) adding the paper to an aqueous medium having a pH of about 4 to about 12 to form a repulpable slurry, and
   (b) heating the repulpable slurry at a temperature of from about 20° C. to about 75° C. with agitation to obtain recycled pulp fibers.

21. A process for repulping the paper of claim 16 comprising:
   (a) adding the paper to an aqueous medium having a pH of about 4 to about 12 to form a repulpable slurry, and
   (b) heating the repulpable slurry at a temperature of from about 20° C. to about 75° C. with agitation to obtain recycled pulp fibers.

* * * * *